(12) United States Patent
Vaithyalingam et al.

(10) Patent No.: US 12,045,365 B2
(45) Date of Patent: Jul. 23, 2024

(54) GOVERNED DATABASE CONNECTIVITY (GDBC) THROUGH AND AROUND DATA CATALOG TO REGISTERED DATA SOURCES

(71) Applicant: International Business Machines Corporation, Armonk, NY (US)

(72) Inventors: Balakumaran Vaithyalingam, Frisco, TX (US); Shikhar Kwatra, San Jose, CA (US); Manus Kevin McHugh, Colorado Springs, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 394 days.

(21) Appl. No.: 17/571,096

(22) Filed: Jan. 7, 2022

(65) Prior Publication Data
US 2023/0222240 A1    Jul. 13, 2023

(51) Int. Cl.
*G06F 21/62* (2013.01)
(52) U.S. Cl.
CPC .. *G06F 21/6227* (2013.01); *G06F 2221/2101* (2013.01); *G06F 2221/2135* (2013.01); *G06F 2221/2141* (2013.01)
(58) Field of Classification Search
CPC ............. G06F 21/6218; G06F 21/6227; G06F 2221/2101; G06F 2221/2113; G06F 2221/2135; G06F 2221/2141
See application file for complete search history.

(56) References Cited

U.S. PATENT DOCUMENTS

| 8,065,725 | B2 | 11/2011 | Zheng et al. |
| 8,499,300 | B2 | 7/2013 | Zimberg et al. |
| 9,129,108 | B2 | 9/2015 | Drissi et al. |

(Continued)

FOREIGN PATENT DOCUMENTS

| CN | 109949195 A | 6/2019 |
| KR | 102242106 B1 | 4/2021 |
| WO | 2016070271 A1 | 5/2016 |

OTHER PUBLICATIONS

Wikipedia, Open Database Connectivity, 2021, https://en.wikipedia.org/wiki/Open_Database_Connectivity.

(Continued)

*Primary Examiner* — Minh Dinh
(74) *Attorney, Agent, or Firm* — Garg Law Firm, PLLC; Rakesh Garg; Rakesh Roy

(57) ABSTRACT

An embodiment includes receiving, at database connectivity (DBC) layer, a request to access data of a data source, wherein the data source is registered with a data catalog that includes data governance artifacts, and wherein the request is made via a connection that bypasses the data catalog. The embodiment also includes comparing, by a governance manager at the DBC layer, an access privilege level for a credential associated with the request to access requirements of requested data included in data protection rules of the governance artifacts. The embodiment also includes masking, by the governance manager, a portion of the data provided in response to the request, wherein the portion of the data has an access requirement that is not met by the access privilege level for the credential associated with the request.

25 Claims, 7 Drawing Sheets

(56) References Cited

U.S. PATENT DOCUMENTS

| | | | |
|---|---|---|---|
| 9,135,123 B1 | 9/2015 | Armangau et al. | |
| 9,338,175 B1 | 5/2016 | Ramos et al. | |
| 10,078,668 B1 | 9/2018 | Woodrow et al. | |
| 10,503,923 B1* | 12/2019 | Gupta | G06F 21/6218 |
| 10,726,146 B2 | 7/2020 | Gilani et al. | |
| 2012/0011077 A1 | 1/2012 | Bhagat | |
| 2016/0162820 A1 | 6/2016 | Povalyayev et al. | |
| 2021/0120044 A1 | 4/2021 | Balan et al. | |
| 2023/0090190 A1* | 3/2023 | Iila | G06F 21/53 726/1 |

OTHER PUBLICATIONS

Wikipedia, Java Database Connectivity, 2021, https://en.wikipedia.org/wiki/Java_Database_Connectivity.

IBM, IBM InfoSphere Optim Data Privacy, 2021, https://www.ibm.com/products/infosphere-optim-data-privacy?p1=Search&p4=43700050329219257&p5=b&gclid=EAlalQobChMIjOK_gviF7wIVcYlbCh319wuQEAAYAiAAEgJ7zvD_BwE&gclsrc=aw.ds.

IBM, IBM Watson Knowledge Catalog, 2021, https://www.IBM.com/cloud/watson-knowledge-catalog.

* cited by examiner

GOVERNED DATABASE CONNECTIVITY (GDBC) THROUGH AND AROUND DATA CATALOG TO REGISTERED DATA SOURCES

BACKGROUND

The present invention relates generally to a method, system, and computer program product for data processing. More particularly, the present invention relates to a method, system, and computer program product for implementing data governance for connections through and around data catalog to registered data sources.

Data governance is a defined process that an organization follows in order to ensure that high quality data exists throughout the complete lifecycle of the data. The key focus areas of data governance include availability, usability, integrity, and security. This includes establishing processes to ensure that important data assets are formally managed throughout an enterprise, and that the data can be trusted for decision-making.

A key part of data governance has to do with establishing and maintaining governance rules that define how to implement data governance policies. For example, some governance rules define governance policies based on data classes. Data classes describe the type of data contained in data assets, such as data fields or table columns. Some examples of data classes include Social security numbers (SSN), Credit card numbers, date of birth, and so on.

For example, a data governance policy may state: "If a data asset contains a column whose data classification is a social security number with a confidence of at least 75%, then all access to that column should be logged." The confidence of a data classification refers to what percentage of the data in the column belongs to that data class. Expressed differently, the above rule states that if at least 75% of the data in the column is of type SSN, then all access to that data asset should be logged.

A data asset is used to represent data. Examples of data assets include a table in a relational database, a file in object storage, or a database that stores JavaScript Object Notation (JSON) data. A data source can be a relational database or object storage, and may contain multiple data assets. A catalog is a metadata repository that stores information about data assets. Typically, whenever a data asset is added to the catalog, the data asset is profiled. As part of the profiling process, the data class is identified for each column. The data asset that is added to the catalog can be, for example, a database or a file in an external system. Hence, these data sources will be evaluated to determine how the governance rules should be applied to the data therein.

SUMMARY

The illustrative embodiments provide for data governance for connections through and around data catalog to registered data sources. An embodiment includes receiving, at database connectivity (DBC) layer, a request to access data of a data source, where the data source is registered with a data catalog that includes data governance artifacts, and where the request is made via a connection that bypasses the data catalog. The embodiment also includes comparing, by a governance manager at the DBC layer, an access privilege level for a credential associated with the request to access requirements of requested data included in data protection rules of the governance artifacts. The embodiment also includes masking, by the governance manager, a portion of the data provided in response to the request, where the portion of the data has an access requirement that is not met by the access privilege level for the credential associated with the request. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
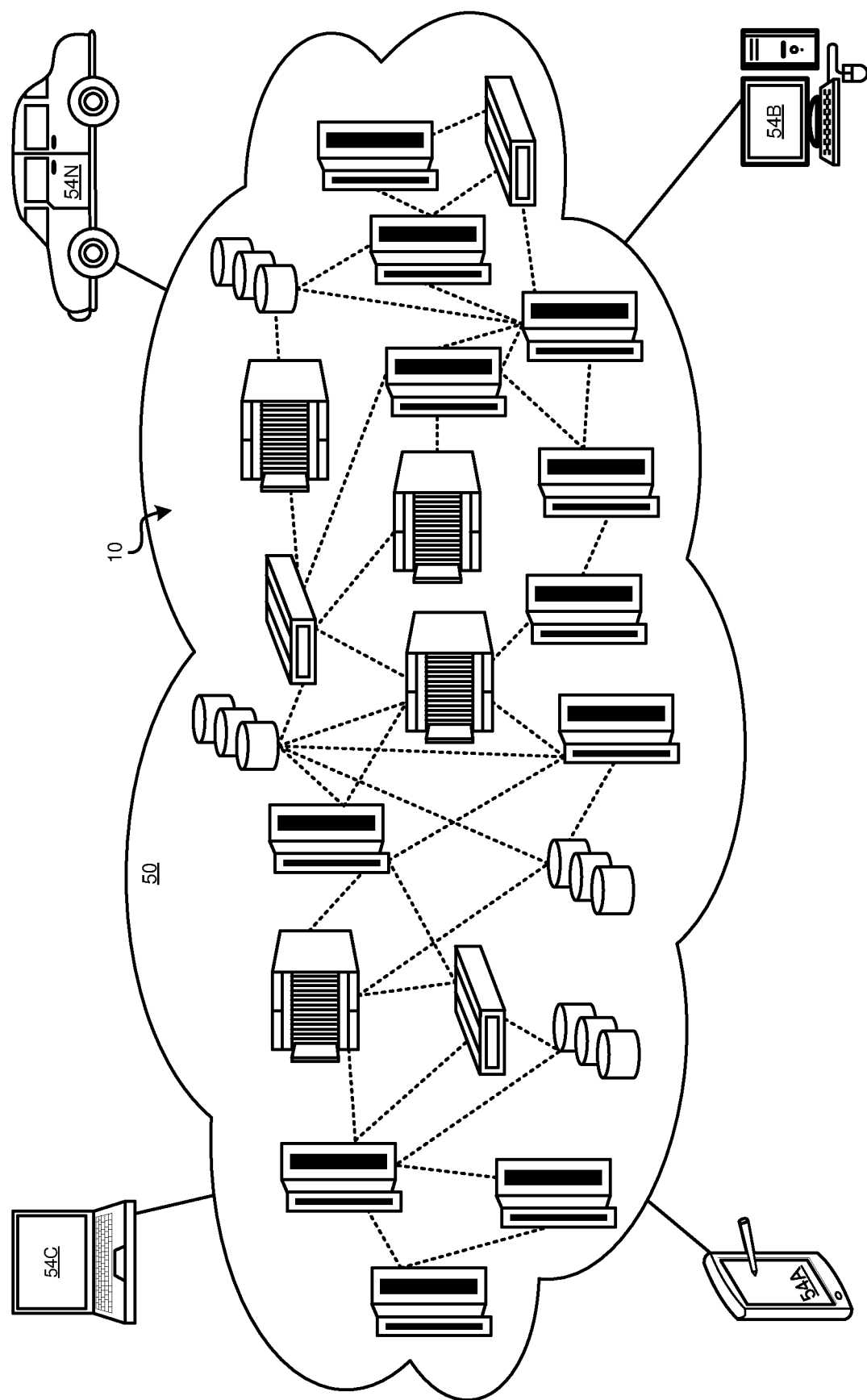
FIG. 1 depicts a cloud computing environment according to an embodiment of the present invention.

Data governance is a defined process that an organization follows in order to ensure that high quality data exists throughout the complete lifecycle of the data. The key focus areas of data governance include availability, usability, integrity, and security. This includes establishing processes to ensure that important data assets are formally managed throughout an enterprise, and that the data can be trusted for decision-making.

The illustrative embodiments provide for data governance for connections through and around data catalog to registered data sources. An embodiment of a data management platform or database system that includes a data catalog and a database connectivity (DBC) layer. In some such embodiments, the database connectivity layer includes data governance functionality and may be referred to as a Governed Database Connectivity (GDBC) layer. Some such embodiments include receiving, at the DBC layer, a request to access data of a data source, where the data source is registered with a data catalog that includes data governance artifacts, and where the request is made via a connection that bypasses the data catalog. In some embodiments, the governance artifacts are stored in a JavaScript Object Notation (JSON) document in the data catalog.

In some embodiments, the request originated from an application, and wherein the method further comprises establishing an application programming interface (API) connection between the application and the DBC layer. In some such embodiments, the method further comprises establishing a socket connection between the application and the DBC layer in the API connection. In some such embodiments, the API comprises a DBC driver for establishing the API connection. The DBC driver may be an open database connectivity (ODBC) driver. In some such embodiments, the method further comprises retrieving, by the DBC driver, the requested data from the data source.

The embodiment also includes comparing, by a governance manager at the DBC layer (e.g., a governance manager of a GDBC), an access privilege level for a credential associated with the request to access requirements of requested data included in data protection rules of the governance artifacts. In some embodiments, if the access privilege level allows for access to all of the requested data, then the GDBC returns the requested data in response to the request as per access control defined in the data catalog. On the other hand, if the access privilege level does not allow for access to all of the requested data, then the GDBC masks or denies access to the unauthorized data, as defined by the governance artifacts from the data catalog system. For example, in some embodiments, if the access privilege level lacks authorization for access to specific data element(s) but includes authorization for others, then the GDBC will mask the unauthorized data elements and will deliver the remaining authorized data elements in response to the request. If the access privilege level does not allow for authorized access to any of the data element(s) of the requested data, then the GDBC will deny access to the data asset.

In some embodiments, the process further comprises generating a log entry in the data catalog that reports and serves as a record of the data request, for example for compliance and audit purposes, and includes a report that the request to access data included an unauthorized access request (if applicable). The exact contents and format of the log and log entries may vary depending on the implementation. For example, log entries may include information such as a requester's username, date and time of the request, target (i.e., requested data), action carried out (requested data returned, requested data partially returned and partially masked, request denied, etc.), an indication of any unauthorized requests.

In some embodiments, the GDBC also provides automated synchronization of data assets from the data source to the data catalog. For example, in some embodiments, the GDBC detects if there are new data assets or changes to the data assets in the data source and, if detected, the GDBC automatically synchronizes the new or revised data assets with the data catalog. Thus, in some embodiments, the process further comprises detecting, by the governance manager, that the request to access data includes new data that is not registered with the data catalog. In some such embodiments, the process includes automatically synchronizing, by the governance manager, the new data with the data catalog, wherein the syncing includes generating metadata for the new data and storing the metadata in the data catalog.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, training data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
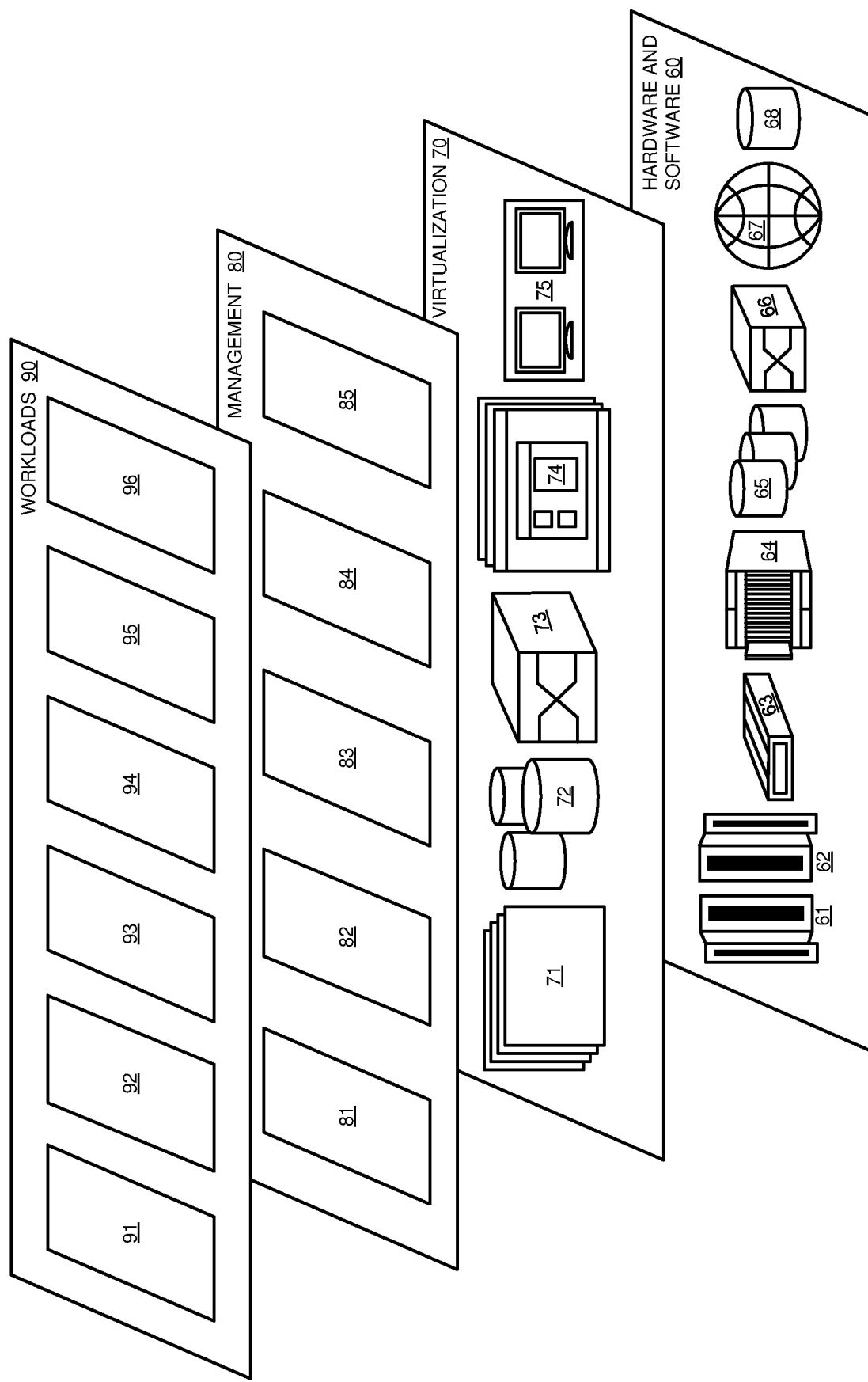
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in the context of the illustrated embodiments of the present disclosure, various workloads and functions 96 for machine learning processing using training validation. In addition, workloads and functions 96 for data governance processing and may include such operations as data cataloging and database management, as described herein. In some embodiments, the workloads and functions 96 for data governance processing also works in conjunction with other portions of the various abstractions layers, such as those in hardware and software 60, virtualization 70, management 80, and other workloads 90 (such as data analytics processing 94, for example) to accomplish the various purposes of the disclosed embodiments.

Figure 3:
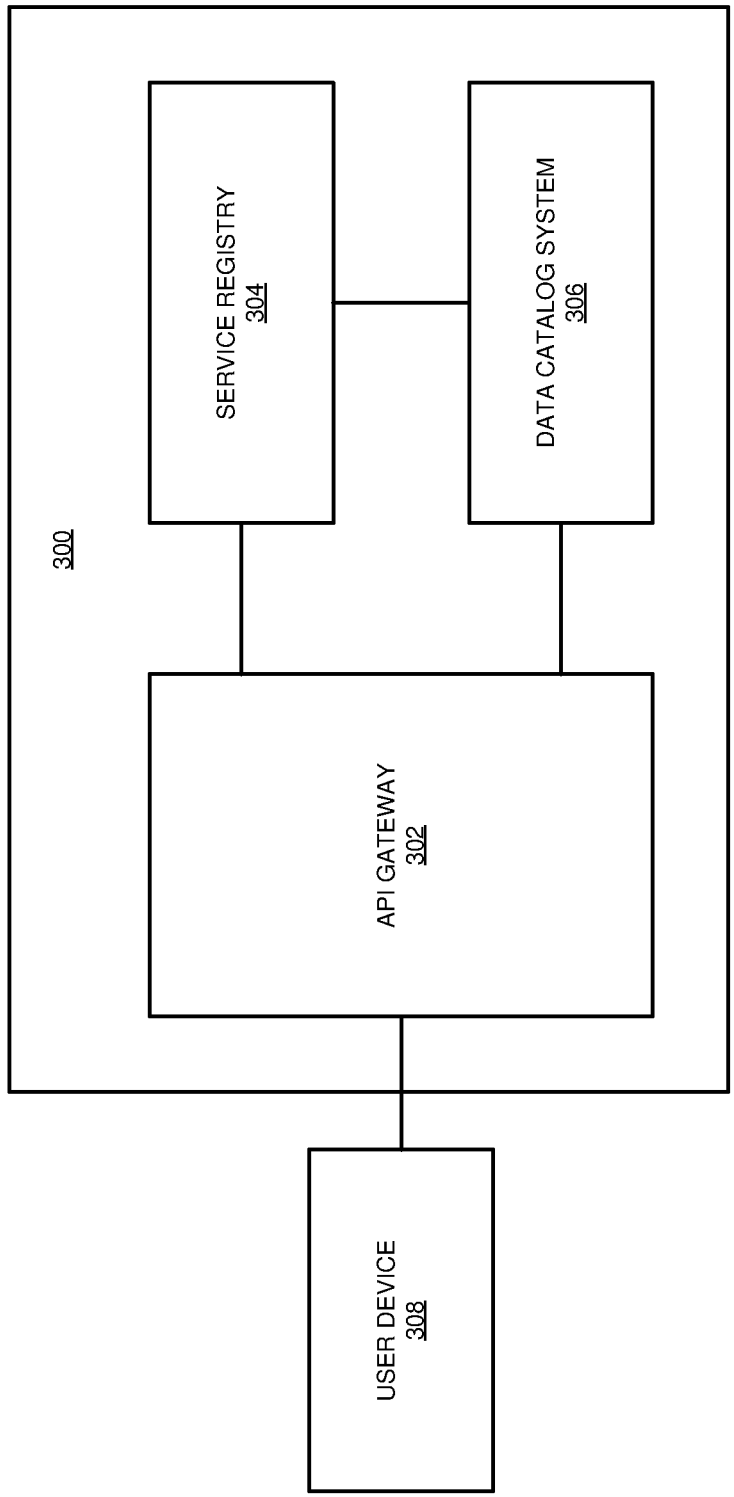
FIG. 3 depicts a block diagram of an example service infrastructure that includes a data catalog system in accordance with an illustrative embodiment.

With reference to FIG. 3, this figure depicts a block diagram of an example service infrastructure 300 that includes a data catalog system 306 in accordance with an illustrative embodiment. In some embodiments, the data catalog system 306 is deployed in workloads layer 90 of FIG. 2. By way of example, in some embodiments, data catalog system 306 is implemented as machine learning processing 96 in FIG. 2.

In the illustrated embodiment, the service infrastructure 300 provides services and service instances to a user device 308. User device 308 communicates with service infrastructure 300 via an API gateway 302. In various embodiments, service infrastructure 300 and its associated data catalog system 306 serve multiple users and multiple tenants. A tenant is a group of users (e.g., a company) who share a common access with specific privileges to the software instance. Service infrastructure 300 ensures that tenant specific data is isolated from other tenants.

In some embodiments, user device 308 connects with API gateway 302 via any suitable network or combination of networks such as the Internet, etc. and use any suitable communication protocols such as Wi-Fi, Bluetooth, etc. Service infrastructure 300 may be built on the basis of cloud computing. API gateway 302 provides access to client applications like data catalog system 306. API gateway 302 receives service requests issued by client applications, and creates service lookup requests based on service requests. As a non-limiting example, in an embodiment, the user device 308 is a card reader device that executes an access routine to determine whether to grant access to a workspace in response to a sensed access card.

In the illustrated embodiment, service infrastructure 300 includes a service registry 304. In some embodiments, service registry 304 looks up service instances of data catalog system 306 in response to a service lookup request such as one from API gateway 302 in response to a service request from user device 308. For example, in some embodiments, the service registry 304 looks up service instances of data catalog system 306 in response to requests from the user device 308 related to accessing data indexed by the data catalog system 306.

Figure 4:
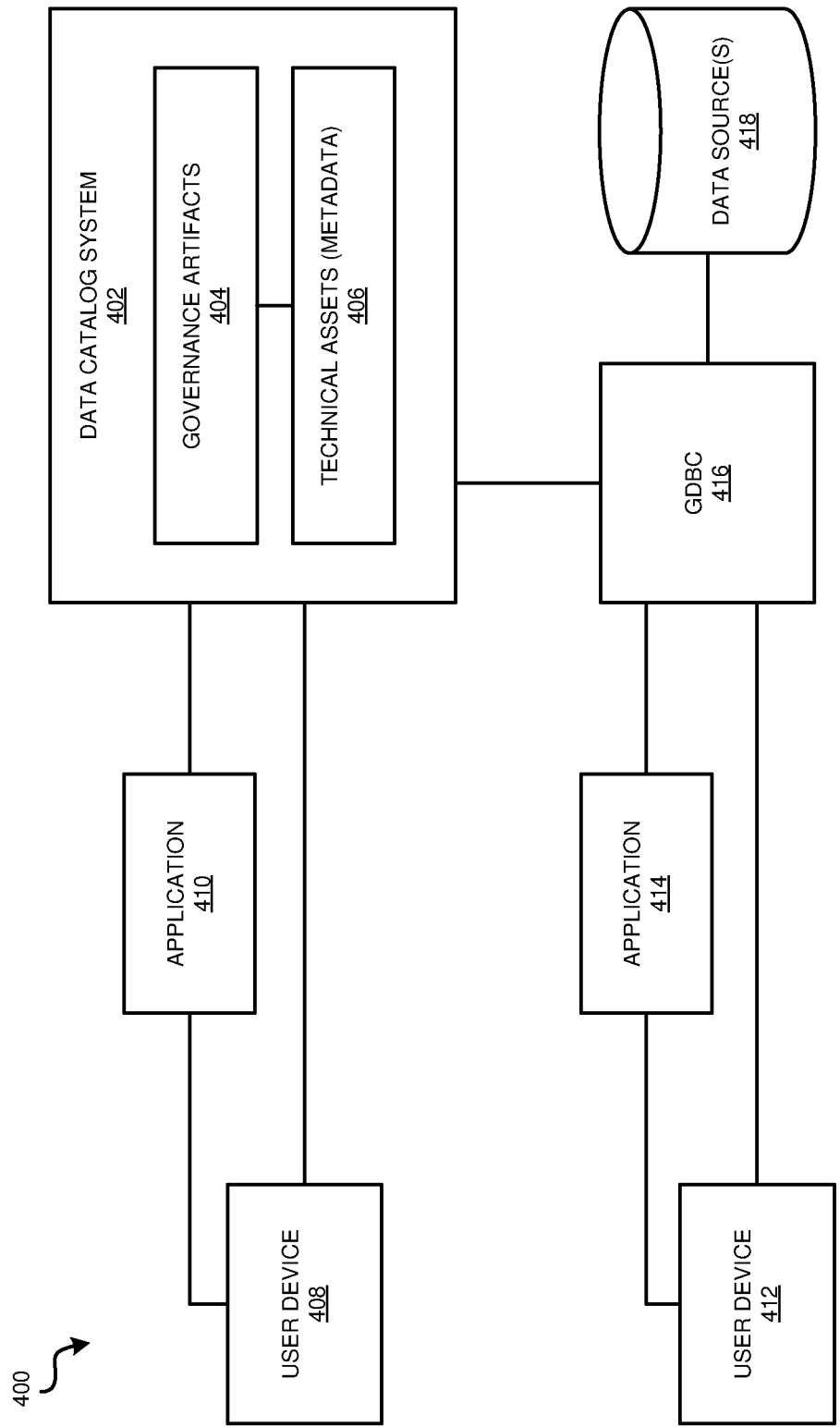
FIG. 4 depicts a block diagram of an example data governance environment in accordance with an illustrative embodiment.

In some embodiments, the request originates from an application on the user device 308, which establishes an API connection between the application and the data catalog system 306 or a DBC layer thereof (e.g., GDBC 414 of FIG. 4). In some such embodiments, the method further comprises establishing a socket connection between the user device 308 and the data catalog system 306 or a DBC layer thereof in the API connection. In some such embodiments, the API comprises a DBC driver for establishing the API connection. The DBC driver may be an open database connectivity (ODBC) driver. In some such embodiments, the user device 308 connects to data sources via the DBC driver.

In some embodiments, the service infrastructure 300 includes one or more instances of the data catalog system 306. In some such embodiments, each of the multiple instances of the data catalog system 306 run independently on multiple computing systems. In some such embodiments, data catalog system 306, as well as other service instances of data catalog system 306, are registered in service registry 304.

In some embodiments, service registry 304 maintains information about the status or health of each service instance including performance information associated each of the service instances. For example, such performance information may include several types of performance characteristics of a given service instance (e.g., cache metrics, etc.). In some embodiments, the extended service registry 304 ranks service instances based on their respective performance characteristics, and selects top-ranking service instances for classification requests. In some such embodiments, in the event that a service instance becomes unresponsive or, unhealthy, the service registry will no longer provide its address or information about this service instance to other services.

With reference to FIG. 4, this figure depicts a block diagram of an example data governance environment 400 in accordance with an illustrative embodiment. In a particular embodiment, the data governance environment 400 is an example of the workloads and functions 96 for data governance processing of FIG. 1.

In some embodiments, the data governance environment 400 includes a data catalog system 402 that comprises governance artifacts 404 and technical assets (metadata) 406. In some embodiments, the data catalog 402 is a detailed inventory of some or all data assets in an organization, and may be provided to help data professionals quickly find the most appropriate data for any analytical or business purpose.

In some embodiments, the technical assets 406 comprises metadata (data that describes or summarizes data) that is used to create an informative and searchable inventory of the organization's data assets. In the illustrated embodiment, the data catalog 402 also comprises governance artifacts 404, which may be in the form of business metadata.

In the illustrated embodiment, governance artifacts 404 includes governance policies, governance rules, data protection rules, business glossary terms, data rules, data classifications, etc. These are generally created by the organization so that data assets can be better managed, maintained, protected, visualized, and reported (e.g., for audit and/or compliance purposes).

In the illustrated embodiment, the data catalog system 402 is in communication with a governance database connectivity module 416 (also referred to more simply as GDBC 416), and one or more data sources 418. The GDBC 416 provides both database driver and data governance functionality. Ideally, user devices and applications, such as user device 408 and application 410, access an organization's data via the data catalog 402. This allows the governance artifacts 404 to enforce governance policies and rules to attempts to access data.

In some cases, user devices and applications, such as user device 412 and application 414, may attempt to access external data sources directly, i.e., without going through the data catalog system 402. Nevertheless, such access will still be subject to data governance by virtue of the data governance functionality being integrated with the database driver in the GDBC 416.

Figure 5:
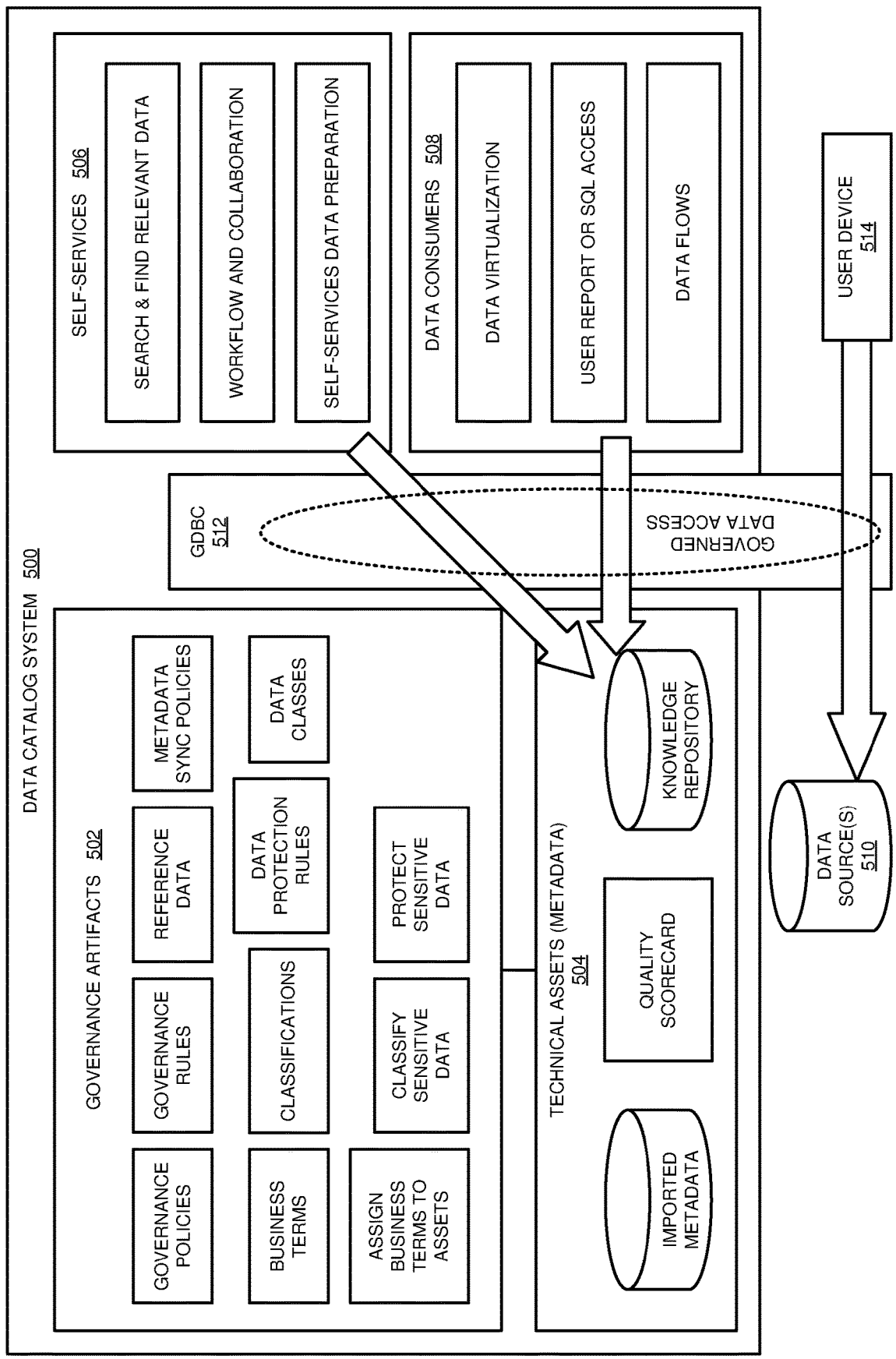
FIG. 5 depicts a block diagram of an example data catalog system in accordance with an illustrative embodiment.

With reference to FIG. 5, this figure depicts a block diagram of an example data catalog system 500 in accordance with an illustrative embodiment. In a particular embodiment, the data catalog system 500 is an example of the data catalog system 402 of FIG. 4. The data catalog system 500 also comprises governance artifacts 502 as an example of governance artifacts 404 of FIG. 4, and comprises technical assets (metadata) 504 as an example of technical assets 406 of FIG. 4.

In the illustrated embodiment, the governance artifacts 502 includes several categories of policies, rules, and other management elements, such as governance policies, governance rules, reference data, metadata sync policies, business terms, classifications, data protection rules, and data classes, as well as procedures for such things as assignment of business terms to assets, classification of sensitive data, and protection of sensitive data. For example, classifications are governance artifacts that can be used to classify data assets based on the level of sensitivity or confidentiality to the organization. Classifications may be used like tags to control groupings of assets in the organization. Unlike data classes that include logic to match data values, classifications are more like labels. Examples of classifications may include Personally Identifiable Information, Sensitive Information, and Confidential information. In an actual implementation, an organization may keep, change, or add classifications that are relevant to that organization.

For example, an organization may create classifications for Restricted Data, Private Data, and Public Data according to their own corporate data security guidelines. To protect highly sensitive data, an organization may create a data protection rule in the governance artifacts 502 to block some users from having access to certain data asset based on the data asset's classification and the user's authorization level.

In some embodiments, in the data catalog system 500, a classification may describe the sensitivity of a whole data asset to help catalog members understand the asset. The organization may use classifications to describe business terms, data classes, reference data sets, and governance rules. In some embodiments, when the data catalog system 500 indexes or syncs with new data assets, the data catalog system 500 automatically profiles and assigns data classes to the new data assets.

In some embodiments, the asset classifications and data classes are included in data protection rules in the governance artifacts 502 to identify the type of data to control. Governance artifacts 502 may also allow asset classifications and data classes to be renamed by associating them with business glossary terms.

In some embodiments, the technical assets 504 include metadata about data sources, such as data source(s) 510, in the form of imported metadata, quality scorecards, and/or a knowledge repository. These assets may be accessed via the data catalog system 500 using self services 506, for example to search and find relevant data, for workflow and collaboration, and for self-services data preparation. These assets may also be accessed via the data catalog system 500 using data consumers 508, such as data virtualization, user reports or SQL access, and data flows. The access is governed by the GDBC 512 using governance artifacts 502. Also, the GDBC 512 governs access to external data sources 510 when a user device 514 attempts to access the external data sources 510 without going through the data catalog system 500.

The illustrative embodiments provide for data governance for connections through and around data catalog 500 to registered data sources 510. An embodiment includes receiving, at database connectivity (DBC) layer, for example GDBC 512, a request to access data of a data source 510, where the data source is registered with a data catalog 500 that includes data governance artifacts 502, and where the request is made via a connection that bypasses the data catalog 500 (e.g., connection from user device 514 to data sources 510 bypassing data catalog 500. In some embodiments, the governance artifacts 502 are stored in a JavaScript Object Notation (JSON) document in the data catalog 500.

Figure 6:
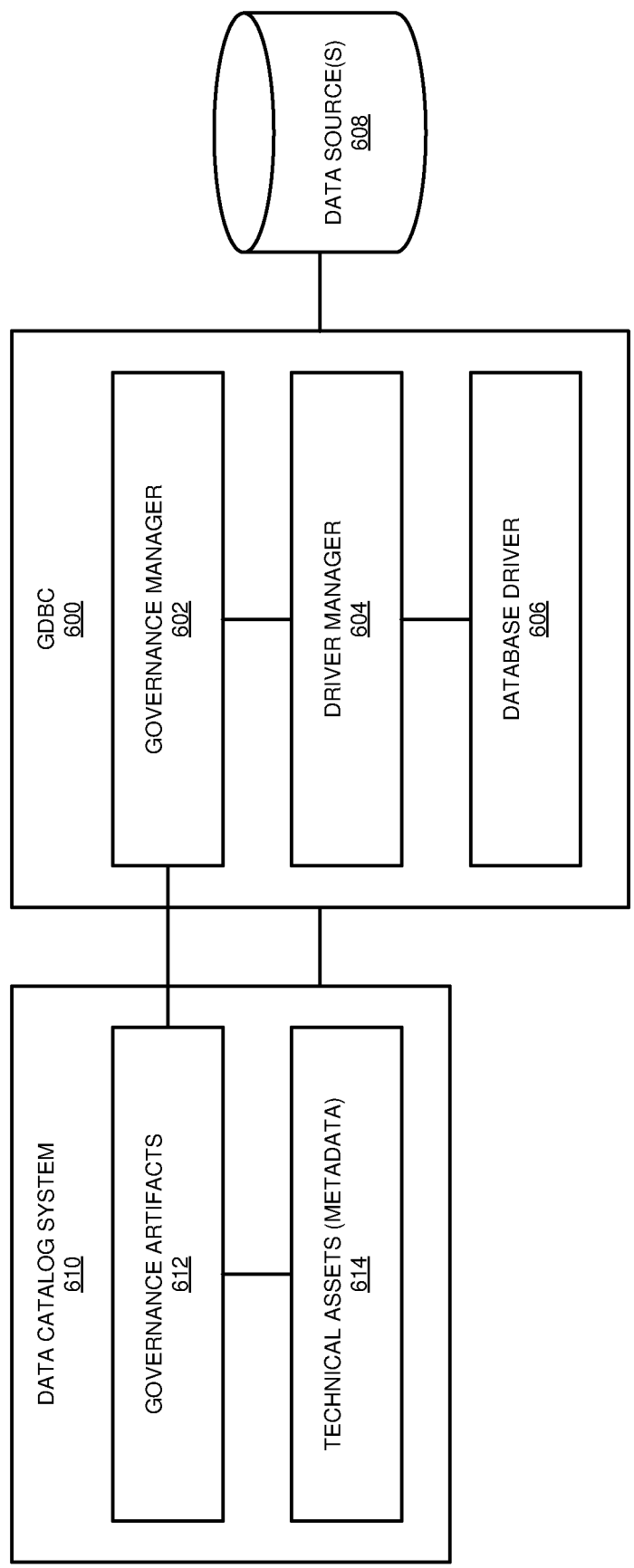
FIG. 6 depicts a block diagram of an example GDBC in accordance with an illustrative embodiment.

With reference to FIG. 6, this figure depicts a block diagram of an example GDBC 600 in accordance with an illustrative embodiment. In a particular embodiment, the GDBC 600 is an example of the GDBC 512 of FIG. 5 or GDBC 416 of FIG. 4. The GDBC 600 is in communication with a data catalog system 610, which is an example of the data catalog system 500 of FIG. 5 or the data catalog system 402 of FIG. 4.

In the illustrated embodiment, the GDBC 600 includes a governance manager 602, a driver 604 for the data source(s) 608, and a database driver 606. In the embodiment, the governance manager 602 uses the governance artifacts 612 to provide data privacy enforcement, data protection enforcement, and general governance policy standards, such as authorize or deny requests for data from the data sources 608. The driver manager 604 and database driver 606 allow the data catalog 610 to connect with the data sources 608, for example to update/synchronize the technical assets 614. The driver manager 604 provides a connection between the governance manager 602 at the DBC layer, an access privilege level for a credential associated with the request to access requirements of requested data included in data protection rules of the governance artifacts. The embodiment also includes masking, by the governance manager 602, a portion of the data provided in response to the request, where the portion of the data has an access requirement that is not met by the access privilege level for the credential associated with the request. In some embodiments, the process further comprises generating a log entry in the data catalog that serves as a record of the data request, for example for compliance and audit purposes, and includes a report that the request to access data included an unauthorized access request (if applicable). The exact contents and format of the log and log entries may vary depending on the implementation. For example, log entries may include information such as a requester's username, date and time of the request, target (i.e., requested data), action carried out (requested data returned, requested data partially returned and partially masked, request denied, etc.), an indication of any unauthorized requests.

In some embodiments, the process further comprises detecting, by the governance manager 602, that the request to access data includes new data that is not registered with the data catalog. In some such embodiments, the process includes automatically synchronizing, by the governance manager, the new data with the data catalog, wherein the syncing includes generating metadata for the new data and storing the metadata in the data catalog.

Figure 7:
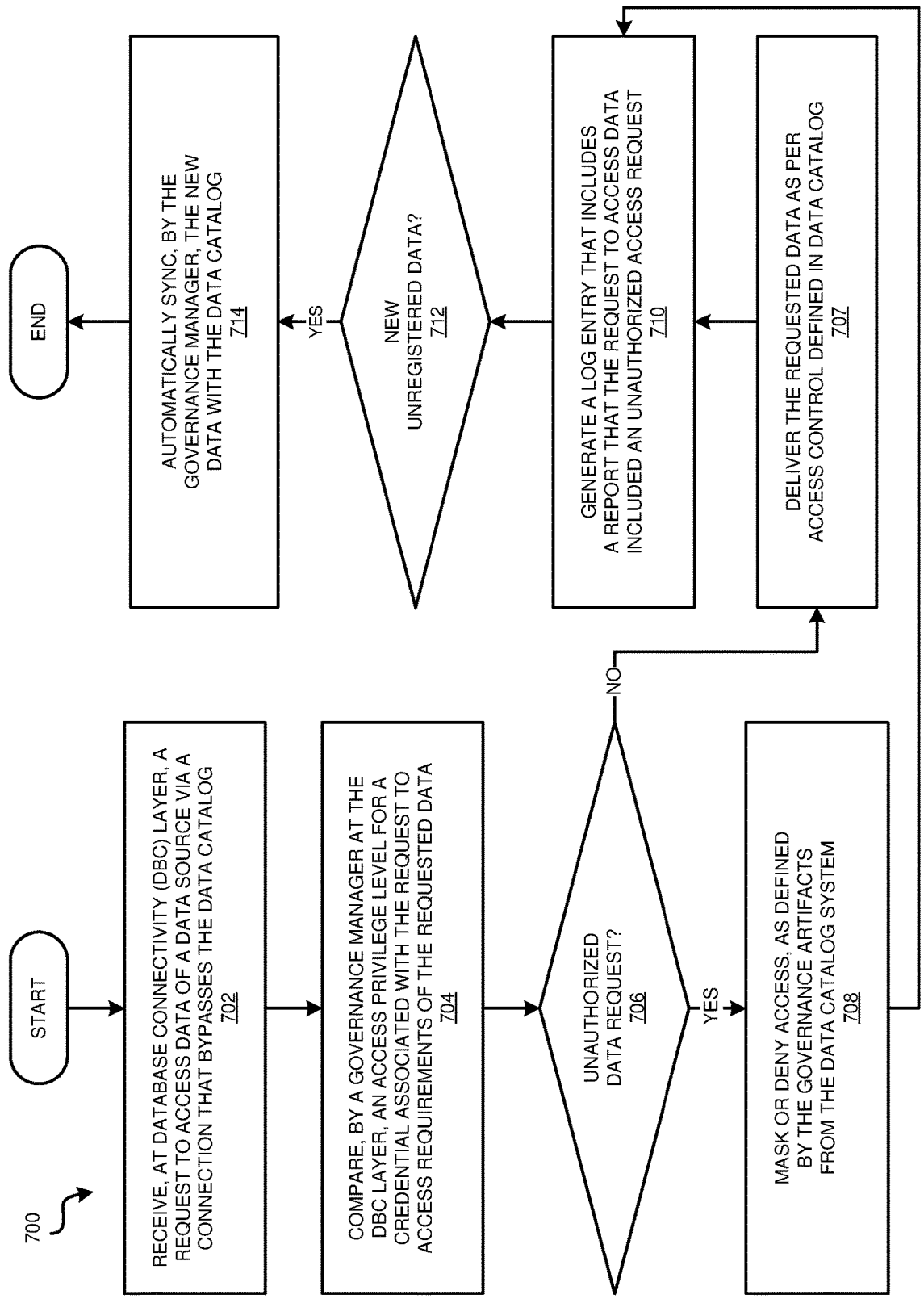
FIG. 7 depicts a flowchart of an example process for implementing data governance for connections through and around data catalog to registered data sources in accordance with an illustrative embodiment.

With reference to FIG. 7, this figure depicts a flowchart of an example process 700 for implementing data governance for connections through and around data catalog to registered data sources in accordance with an illustrative embodiment. In a particular embodiment, the GDBC 416, 512, or 600 carries out the process 700.

In an embodiment, at block 702, the process receives, at a database connectivity (DBC) layer, a request to access data of a data source via a connection that bypasses the data catalog. Next, at block 704, the process compares, by a governance manager at the DBC layer, an access privilege level for a credential associated with the request to access requirements of requested data. Next, at block 706, the process determines if the data request includes an unauthorized request, for example based on the access privilege level of the credential from block 704.

If no authorization deficiencies are detected ("NO" from block 706), then the process continues to block 707, where the GDBC delivers the requested data in response to the request as per access control defined in the data catalog. On the other hand, if an unauthorized data request is detected ("YES" from block 706), then the process continues to block 708, where the GDBC masks or denies access to the unauthorized data, as defined by the governance artifacts from the data catalog system. For example, in some embodiments, if the access privilege level lacks authorization for access to specific data element(s) but includes authorization for others, then the GDBC will mask the unauthorized data elements and will deliver the remaining authorized data elements in response to the request. If the access privilege level does not allow for authorized access to any of the data element(s) of the requested data, then the GDBC will deny access to the data asset.

Next, at block 710, the process generates a log entry in the data catalog that serves as a record of the data request, for example for compliance and audit purposes, and includes a report that the request to access data included an unauthorized access request (if applicable). Next, at block 712, the process determines if the data request references data that is not registered with the data catalog. If so, then at block 714 the process automatically synchronizes the new data with the data catalog.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
receiving, at database connectivity (DBC) layer, a request to access data of a data source, wherein the data source is registered with a data catalog that includes data governance artifacts, and wherein the request is made via a connection that bypasses the data catalog;
comparing, by a governance manager at the DBC layer, an access privilege level for a credential associated with the request to access requirements of requested data included in data protection rules of the governance artifacts; and
masking, by the governance manager, a portion of the data provided in response to the request, wherein the portion of the data has an access requirement that is not met by the access privilege level for the credential associated with the request.

2. The method of claim 1, further comprising generating a log entry that includes a report that the request to access data included an unauthorized access request.

3. The method of claim 1, further comprising detecting, by the governance manager, that the request to access data includes new data that is not registered with the data catalog.

4. The method of claim 3, further comprising automatically synchronizing, by the governance manager, the new data with the data catalog, wherein the synchronizing includes generating metadata for the new data and storing the metadata in the data catalog.

5. The method of claim 1, wherein the request originated from an application, and wherein the method further comprises establishing an application programming interface (API) connection between the application and the DBC layer.

6. The method of claim 5, further comprising establishing a socket connection between the application and the DBC layer in the API connection.

7. The method of claim 6, wherein the API comprises a DBC driver for establishing the API connection.

8. The method of claim 7, wherein the DBC driver is an open database connectivity (ODBC) driver.

9. The method of claim 7, further comprising retrieving, by the DBC driver, the requested data from the data source.

10. The method of claim 1, wherein the governance artifacts are stored in a JavaScript Object Notation (JSON) document in the data catalog.

11. A computer program product, the computer program product comprising one or more computer readable storage media, and program instructions collectively stored on the one or more computer readable storage media, the program instructions executable by one or more processors to cause the one or more processors to perform operations comprising:
receiving, at database connectivity (DBC) layer, a request to access data of a data source, wherein the data source is registered with a data catalog that includes data governance artifacts, and wherein the request is made via a connection that bypasses the data catalog;
comparing, by a governance manager at the DBC layer, an access privilege level for a credential associated with the request to access requirements of requested data included in data protection rules of the governance artifacts; and
masking, by the governance manager, a portion of the data provided in response to the request, wherein the portion of the data has an access requirement that is not met by the access privilege level for the credential associated with the request.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

14. The computer program product of claim 11, wherein the operations further comprise generating a log entry that includes a report that the request to access data included an unauthorized access request.

15. The computer program product of claim 11, wherein the operations further comprise detecting, by the governance manager, that the request to access data includes new data that is not registered with the data catalog.

16. The computer program product of claim 15, wherein the operations further comprise automatically synchronizing, by the governance manager, the new data with the data catalog, wherein the synchronizing includes generating metadata for the new data and storing the metadata in the data catalog.

17. A computer system comprising one or more processors and one or more computer readable storage media, and program instructions collectively stored on the one or more computer readable storage media, the program instructions executable by the one or more processors to cause the one or more processors to perform operations comprising:
- receiving, at database connectivity (DBC) layer, a request to access data of a data source, wherein the data source is registered with a data catalog that includes data governance artifacts, and wherein the request is made via a connection that bypasses the data catalog;
- comparing, by a governance manager at the DBC layer, an access privilege level for a credential associated with the request to access requirements of requested data included in data protection rules of the governance artifacts; and
- masking, by the governance manager, a portion of the data provided in response to the request, wherein the portion of the data has an access requirement that is not met by the access privilege level for the credential associated with the request.

18. The computer system of claim 17, wherein the operations further comprise generating a log entry that includes a report that the request to access data included an unauthorized access request.

19. The computer system of claim 17, wherein the operations further comprise detecting, by the governance manager, that the request to access data includes new data that is not registered with the data catalog.

20. The computer system of claim 19, wherein the operations further comprise automatically synchronizing, by the governance manager, the new data with the data catalog, wherein the syncing includes generating metadata for the new data and storing the metadata in the data catalog.

21. A data management platform comprising:
- one or more processors;
- one or more computer readable storage media; and
- program instructions collectively stored on the one or more computer readable storage media, the program instructions executable by one or more processors to cause the one or more processors to perform operations comprising:
  - receiving, at database connectivity (DBC) layer, a request to access data of a data source, wherein the data source is registered with a data catalog that includes data governance artifacts, and wherein the request is made via a connection that bypasses the data catalog;
  - determining, by a governance manager at the DBC layer, whether an access privilege level for a credential associated with the request satisfies an access requirement of the requested data, the access requirement being included in data protection rules of the governance artifacts; and
  - denying, by the governance manager responsive to determining that the access privilege level fails to satisfy the access requirement, the request to access the data.

22. The data management platform of claim 21, wherein the operations further comprise generating a log entry that includes a report that the request to access data included an unauthorized access request.

23. A governed database connectivity (GDBC) layer comprising:
- one or more processors;
- one or more computer readable storage media; and
- program instructions collectively stored on the one or more computer readable storage media, the program instructions executable by one or more processors to cause the one or more processors to perform operations comprising:
  - receiving, by the GDBC, a request to access data of a data source, wherein the data source is registered with a data catalog that includes data governance artifacts, and wherein the request is made via a connection that bypasses the data catalog;
  - determining, by the GDBC, whether an access privilege level for a credential associated with the request satisfies an access requirement of at least a portion of the requested data, the access requirement being included in data protection rules of the governance artifacts; and
  - masking, by the GDBC in a case where the GDBC determines that the access privilege level satisfies the access requirement of a first portion of the requested data but fails to satisfy the access requirement of a second portion of the requested data, the second portion of the data provided in response to the request.

24. The GDBC of claim 23, wherein the operations further comprise denying, by the GDBC in a case where the GDBC determines that the access privilege level fails to satisfy the access requirement of all of the requested data, the request to access the data.

25. The GDBC of claim 23, wherein the operations further comprise generating a log entry that includes a report that the request to access data included an unauthorized access request.

* * * * *